July 6, 1937.　　G. R. BAKER ET AL　　2,086,347
FEEDING BISCUIT SHAPES AND THE LIKE FROM INTERMITTENT CUTTING
MECHANISM TO CONTINUOUSLY TRAVELING OVENS OR LIKE CONVEYERS
Filed July 17, 1935　　3 Sheets-Sheet 1
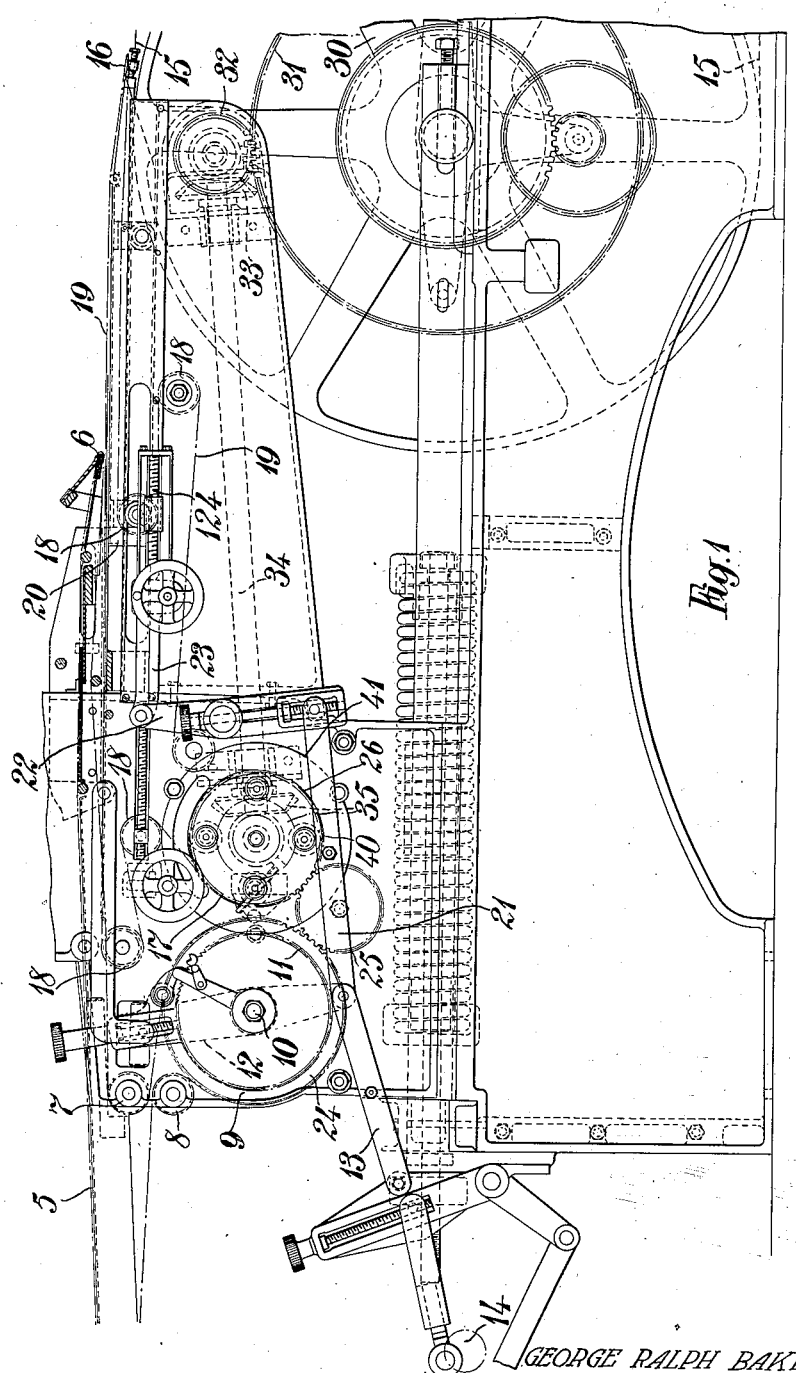
GEORGE RALPH BAKER
HERBERT KIRMAN
INVENTORS
ATTORNEY

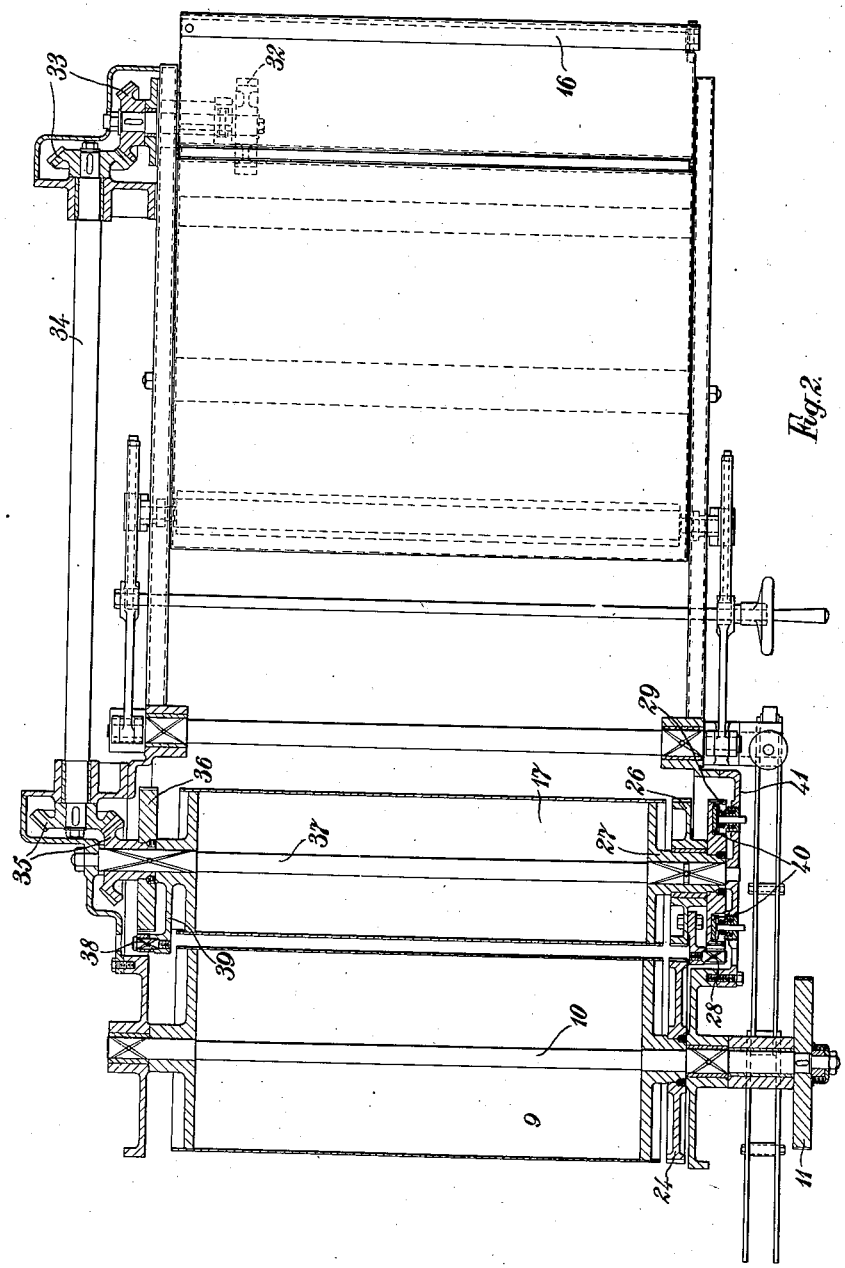

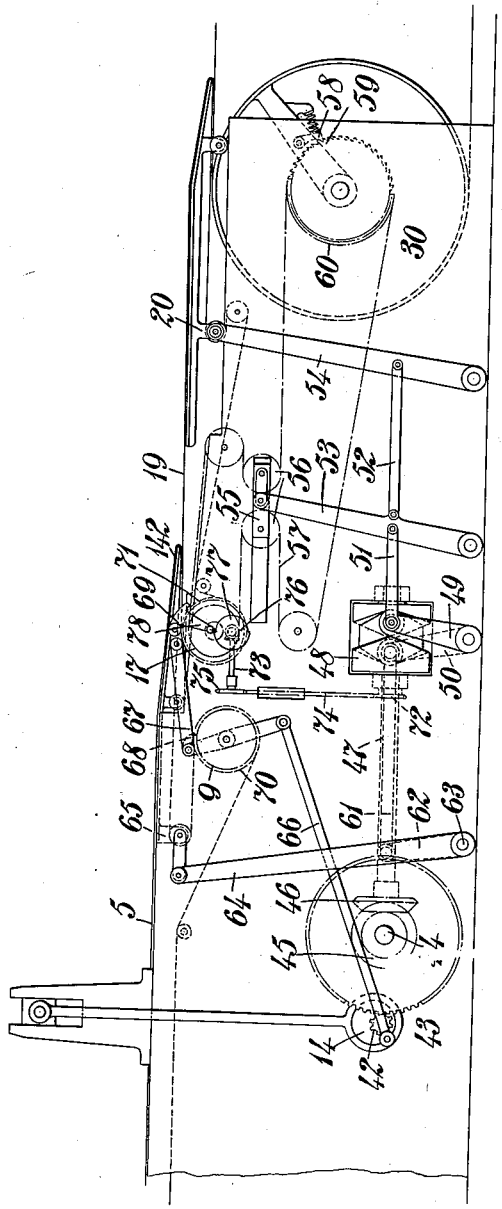
George Ralph Baker
Herbert Kirman
Inventors

Patented July 6, 1937

2,086,347

UNITED STATES PATENT OFFICE 2,086,347

FEEDING BISCUIT SHAPES AND THE LIKE FROM INTERMITTENT CUTTING MECHANISM TO CONTINUOUSLY TRAVELING OVENS OR LIKE CONVEYERS

George Ralph Baker and Herbert Kirman, Peterborough, England, assignors to Baker Perkins Co. Inc., Saginaw, Mich.

Application July 17, 1935, Serial No. 31,926
In Great Britain July 17, 1934

5 Claims. (Cl. 107—7)

This invention relates to the automatic delivery or panning of biscuit shapes (hereinafter referred to as "biscuits") and the like to an oven or other conveyer of the continuously traveling type (hereinafter referred to as "oven") from a cutting machine of the kind having a biscuit conveyer which is given a step-by-step movement between the operations of the cutting head or mechanism.

Biscuit cutting machines having a continuously traveling conveyer web have heretofore been arranged for feeding onto oven conveyers, as described in our United States Patent No. 1,787,254. The output of a plant of this type is seriously limited, so that either the maximum speed, or the full capacity of the oven conveyer can not be utilized.

In a biscuit cutter using a continuously traveling web the cutter head must be given a translatory reciprocation, so that during the cutting operation it can travel with the moving conveyer. Accordingly the cutter head can carry only a single row of cutters transversely of the conveyer, or two rows of small cutters within the range of translatory movement of the head. It is, therefore, not practicable to operate cutting mechanisms of this kind rapidly enough to supply the capacity of a normally operating oven.

The output of a single biscuit cutting machine can, however, be multiplied by employing a plurality of rows of cutters mounted in a cutter head which reciprocates vertically only, and imparting to the cutter conveyer an intermittent travel, so that it is stationary during the biscuit cutting operation. Our invention has for its principal object the provision of novel means for feeding the output of such a cutting machine from its intermittently moving conveyer onto the continuously traveling conveyer band of an oven.

The principal object of the present invention is to remove the above shortcomings and limitations. It provides improvements whereby the output of an intermittently operated cutting machine delivering to a continuously traveling oven or conveyer may be increased and yet operate at a normal cutting rate adequate to supply an oven or other conveyer traveling at the usual baking or like speed.

According to our invention a cutting machine adapted to cut a plurality of rows of biscuits at each operation is provided. In conjunction with such a multiple-row cutter differential conveying means is located intermediate the conveyer on which the cutting takes place and the oven conveyer band. The intermediate conveyer receives cut biscuits at the speed of the cutter web during intermittent movements thereof and discharges the biscuits onto the oven conveyer at a speed corresponding to that of the oven conveyer.

A feature of the invention lies in providing differential conveying means comprising a reciprocating panner blade driven from the cutting machine (or means synchronized therewith), an endless apron around the panner blade continuously driven by the oven (or at a speed synchronized therewith) and having an intermittent drive from the cutting machine web mechanism (or means synchronized therewith) so as to impart coincidental intermittent movements to the apron so that the apron shall travel at a speed corresponding with that of the cutting web during the time it is receiving biscuits. But when delivering biscuits the apron shall travel at a speed approximating that of the oven.

Further features of the invention will be hereinafter described and defined in the claims.

In the accompanying drawings:—

Figure 1 is a side elevation, and

Figure 2 a section plan (to a large scale) of a machine according to the invention.

Figure 3 is an elevation of a modified type of machine.

In carrying the invention into effect according to one convenient mode (see Figures 1 and 2) as described by way of example as applied to the delivery of biscuits to a continuously traveling steel band oven, a cutting machine having a cutter head or mechanism (not shown) adapted to cut a plurality (two, three, four or more) of rows of biscuits at each stroke is provided. The cutting machine web 5 at the discharge end of the cutting machine is turned around a fixed knife edge 6 and passes over guide rolls 7 and 8 and a driving roll 9 which is driven intermittently through any suitable gear from the cutting machine.

The driving roll 9 of the cutting machine web 5 may be driven so that the cuting machine web is advanced during the intervals between the cutting operations a distance equal to the number of rows cut at each operation. For example, the shaft 10 of the driving roll 9 may be provided with a ratchet wheel 11 having a pivoted pawl lever 12 oscillated by a link 13 connected to an appropriate crank mechanism 14 of the cutting machine.

The delivery end of the cutting machine is disposed in spaced relationship to the steel band 15 of the oven, the space between the two being occupied by the differential panning device. This panning device comprises a frame embodying a reciprocating panner blade 16 and drive and guiding rolls 17 and 18 for an endless apron 19 which passes around the panner blade 16. The rear end of the apron is positioned to lie under the fixed knife edge 6 of the cutting machine web. One of the guide rollers 18 of the apron is carried by the reciprocating carriage 20 of the panner blade 16 so as to compensate (in known manner) for the variations in the path of travel of the apron due to the reciprocations of the panner blade.

The pawl lever 12 for driving the cutting machine web 5 may also be conveniently utilized for operating the panner carriage 20, for example it may be connected by a link 21 to a double-armed pivoted lever 22 for reciprocating the panner, the connection between the carriage 20 and lever 22 being by a link 23 and adjusting mechanism 124 of known form. The operation of the parts is arranged to cause the panner 16 to make a retreating movement during each period of rest of the cutting machine web 5. The driving connection 22 and 23 for the panner carriage is adjustable so that the position of the panner blade may be varied with respect to the oven band.

The driving roller 17 for the panner apron 19 may be conveniently driven through suitable gearing embodying a free wheel clutch from the cutting web driving roll 9 so that the apron 19 is traversed forwardly at a speed corresponding with the cutting machine web during its intervals of movement.

This drive may be effected by a gear wheel 24 fixed to the drum 9 and meshing with an idle gear 25 (Figure 1) which in turn meshes with a gear wheel 26 loosely mounted upon the trunnion 27 of the drum 17.

Referring to Fig. 2, the gear wheel 26 carries a pawl 28 engaging a ratchet wheel 29 fixed to the drum 17. It will thus be seen that on each driving stroke of the pawl lever 12 movement will be imparted to the drum 17 through the gears 24, 25 and 26 and the pawl 28 and ratchet wheel 29. The driving roll 17 of the apron 19 also has a continuous drive connection with the oven conveyer or drive or means operating synchronously therewith. For example, the steel band terminal drum 30 may drive the drum 17 through a free wheel clutch which permits the oven drive to the apron 19 to be overrun by the cutting conveyer drive thereto at each intermittent operation.

According to a convenient arrangement the terminal drum 30, through gearing 31, 32 and bevel gear 33 drives a counter shaft 34 (Fig. 1). Through bevel gearing 35 the counter shaft drives a ratchet wheel 36 (Fig. 2), which is loose upon the shaft 37 of the drum 17. The ratchet wheel 36 engages a pawl 38 carried by an arm 39 on the end plate of the drum 17.

Instead of the gearing described the ratchet wheel 36 (Fig. 2) may be driven from the oven conveyer drum 30 (Fig. 1) by a free wheel chain drive or any other suitable means may be employed for driving the panner apron at the oven speed during the period of biscuit delivery while permitting the apron to be driven at a speed corresponding with the cutting machine web during the period of reception of biscuits from the cutter web.

In operation each batch of biscuits cut by the cutting machine is discharged over the fixed knife edge 6 by the cutting machine web 5 on to the panner apron 19. During this period the cutting web drive communicates motion to the panner apron 19 at a speed corresponding with the cutting web. Each period of reception is followed by a period of rest in the cutting machine web while the next cutting operation is taking place. During this period of rest the drive to the panner apron 19 from the cutting machine is idle but the motion of the apron 19 continues due to the continuous drive from the oven drum 30. A batch of biscuits which has reached the forward end of the panner blade 16 is discharged upon the oven band 15 by the forward movement of the band and the retreating movement of the reciprocating panner blade, as the pawl drive 11 and 12 from the cutter web is drawn back to regain its driving position during the rest interval. These alternate operations of receiving and discharging are repeated during each period of movement and rest, respectively, of the cutting machine web.

In order to control the drive of the apron 19 in view of the nature of its drive through pawls and ratchet wheels, a light friction brake is provided comprising spring pressed pads 40 carried by the framing 41 and engaging a surface in the ratchet wheel 29.

Where it is desired to open or close up the spaces on the oven band 15 between batches as they come from the cutter, means may be provided for accelerating or retarding the average rate of travel of the apron and oven band relatively to the speed of operation of the cutting machine. Our earlier patent referred to above describes the construction and operation of mechanism suitable for this purpose.

It may also be desirable to have the stroke of the panner blade adjustable to accommodate longer or shorter batches of biscuits obtained with cutters of different sizes.

In the biscuit plant just described, to which the invention of Figs. 1 and 2 is applied, the cutter produces separate batches spaced apart on the cutter conveyer. In carrying the invention into effect according to another mode (see Figure 3) for the delivery of large biscuit sheets (each made up of a plurality of smaller attached sheets) on which the cutter impresses dividing lines as, for example, in connection with crackers; instead of employing a fixed knife edge over which the cutter web 5 travels at the delivery point, a reciprocating panner blade 142 is employed, the forward stroke of which synchronizes with the delivery of the differential conveyer 19 to the oven. The differential conveyer is given an intermittently accelerated movement during the reception of biscuit sheets from the cutting web panner, while when the foremost biscuit sheet is being discharged into the oven, the conveyer 19 travels continuously for a period at a rate approximating to that of the oven travel rate.

This intermittent drive may be effected by ratchet and pawl mechanism through a clutch, cam or other means being employed to clutch and declutch the ratchet mechanism from the driven shaft at the beginning and termination of the intermittent drive period. When the intermittent drive is declutched the same clutch or another clutch establishes connection between a continuous driving member and the conveyer. Alternatively, instead of employing a clutch, means may be provided to lift or knock out the operating pawl (or pawls) so that such operates idly during the period of continuous drive. Referring to Figure 3, the crank shaft of the cutting machine carries a pinion 42 meshing with a gear 43 on shaft 44. The latter, through the bevel gears 45, 46 drives a cam shaft 47 on which a cam 48 is fixed. The cam oscillates a pair of levers 49 and 50.

The lever 49 by means of the links 51 and 52 oscillates a pair of levers 53 and 54 connected respectively to a compensating carriage 55 and to the panner carriage 20.

The compensating carriage carries a pair of sprocket wheels 56 for the compensating loops of a chain 57 which imparts a drive from the oven drum 30 to the driving drum 17 of the differential conveyer 19. The drive from the oven drum 30 to the chain is by way of the pawl 58 carried by the drum and the ratchet wheel 59 fixed to the sprocket wheel 60.

The lever 54 is connected to and reciprocates the carriage 20 around which the panning web 19 is passed.

The lever 50 is connected by a link 61 to a lever 62 mounted upon a rock shaft 63 which also carries a lever 64. The lever 64 is adapted to reciprocate the carriage 65 on which the panner blade 142 is mounted and about which the cutting machine web 5 is passed.

The driving drums 9 and 17 of the cutting machine web 5 and differential conveyer apron 19 are driven from the crank disc 14 by the links 66, 67 and pawls 68, 69, engaging respectively the ratchet wheels 70 and 71.

On the cam shaft 47 a sprocket wheel 72 is mounted by which a shaft 73 is driven through the chain and sprocket 74, 75. The shaft 73 through bevel wheels 76 drives a cam shaft on which a cam 77 is mounted. The cam 77 is formed with two portions, of different radius with which the tail of the pawl lever 78 engages, the arrangement being such that when the portion of larger radius is operative the pawl 69 is lifted from the ratchet wheel 71 and no drive is imparted to the web 19 from the cutting machine; whereas when the portion of smaller radius is operative, a drive is imparted to the web 19 from the cutting machine.

As shown in Figure 3 the panner carriage 20 is fully forward ready to pan a batch of biscuits on to the oven, while the carriage 65 is fully back ready to move forward, during which forward movement no deposit of biscuits on the panning web 19 will take place. The cam 77 is in a position in which the pawl 69 is lifted free of the ratchet wheel 71, and thus by means of the chain drive 57 from the oven drum 30, the panning conveyer 19 will be driven at the oven speed.

When the panning carriage 20 is fully back, the cutting carriage 65 will be in its forward position ready to deposit biscuits from the cutting machine web 5 on to the differential panning web 19. The cam 77 will now allow the pawl 69 to engage the ratchet wheel 71 and the compensating movement of the carriage 55 on the chain 57 will be such as to leave the panning web 19 free to be driven by the pawl 69.

The gear wheels 42 and 43 may be interchangeable so that batches of biscuits may have different numbers of rows.

During the panning of biscuits on to the oven, the apron 19 is driven continuously at approximately oven speed which is achieved by a movement of the compensating carriage 55 to the right as shown in the Figure 3. When the compensating carriage moves in the other direction it takes up the continuous drive of the chain forward and the resultant travel at the driving drum 17 is zero, i. e. there is no drive of the sprocket 71 by the chain 57.

During this period the cutting machine panner is delivering biscuits and the receiving portion of the apron 19 is given a series of intermittent steps forward through the ratchet gears 69, 71 from the cutting machine in time with the intermittent travel of the cutting apron. Thus the whole batch of biscuits is panned onto the apron 19 at the same spacing as they are on the cutting conveyer.

According to the preceding arrangement shown in Fig. 3 it will be apparent that the differential conveyer is driven intermittently from the cutting conveyer drive while it receives a biscuit sheet, and that during this period the accelerated travel of the differential conveyer 19 is utilized to advance the previously delivered biscuit sheet to the end of the panner blade 20, ready for discharge into the oven at the commencement of the next continuous period of travel. During the discharge of a biscuit sheet onto the oven conveyer, the cutter panner 142 is advancing to hold up the delivery of the biscuit sheets to the conveyer 19, the arrangement being such that when movement of the cutter conveyer 5 stops, the cutter panner blade 142 retreats and the delivery of the next biscuit sheet to the conveyer 19 commences.

By means of the reciprocating blade 142 the delivery of cut biscuits on to the differential web 19 can be interrupted for a longer period than the interval of rest of the cutting web between the strokes of the cutter; otherwise, if the depositing of a batch of biscuits on to the oven band 15 had to take place in the very short intervals of rest between the cutting strokes, the travel of the blade 20 backwardly to deliver the batch would have to be excessively fast.

Although the above arrangement is primarily useful for delivering dough sheets for crackers it may be also used to deliver batches of cut biscuit shapes which comprise a plurality of rows.

We claim:

1. Transfer mechanism for feeding biscuits or the like from an intermittently traveling cutter conveyer to a continuously traveling oven conveyer comprising in combination a reciprocating panner blade arranged to deliver biscuits onto said oven conveyer, an endless apron passing around said blade arranged to receive biscuits from said cutter conveyer, means for actuating said panner blade in timed relation to the travel of said cutter conveyer, means for driving said apron from said oven conveyer including an overrunning clutch, and means for driving said apron from said cutter conveyer overrunning said clutch during the periods of travel of the cutter conveyer.

2. Apparatus as claimed in claim 1, wherein the transfer apron is provided with a driving roll, a pawl is fixed to said roll, and a ratchet wheel driven from said oven conveyer engages said pawl to rotate the pawl and roll, and wherein a second ratchet wheel is fixed to said driving roll and a pawl driven from the cutter conveyer mechanism operatively engages said second ratchet to rotate the ratchet and said roll.

3. Transfer mechanism for feeding biscuits or the like from an intermittently traveling cutter conveyer to a continuously traveling oven conveyer comprising in combination a reciprocating panner blade arranged to deliver biscuits onto said oven conveyer, an endless apron passing around said blade arranged to receive biscuits from said cutter conveyer, means for actuating said panner blade in timed relation to the travel of the cutter conveyer, a chain drive from said oven conveyer to said apron, a reciprocatory compensating gear over which two bights of said chain drive pass, means for reciprocating said gear in timed relation to the travel of the cutter conveyer to interrupt intermittently the driving of the apron by the chain, and means for driving the apron during the interruption in its drive from the oven conveyer, including a driving roll for said apron, a ratchet wheel fixed to said roll, a pawl actuated from the cutter mechanism to rotate the ratchet, and means for putting said pawl out of action while the apron is being driven from the oven conveyer.

4. Apparatus as claimed in claim 3, wherein a rotary cam driven synchronously with said panner blade is operable to disengage said pawl from the ratchet and interrupt the drive of the apron while said apron is driven by the oven conveyer.

5. In a biscuit plant comprising an intermittently operating cutting machine and a continuously traveling oven conveyer, in combination, a conveyer for said cutting machine, a reciprocating panner blade associated with and operable in timed relation to said cutting machine conveyer, differential conveying means between said cutting machine and oven conveyers comprising a second reciprocating panner blade operable in timed relation to the cutting machine conveyer, an endless apron passing around said second panner blade, means for driving said apron in timed relation to the said oven conveyer, said driving means including compensating means operable to cause the apron to be driven at the speed of said oven conveyer during delivery thereto and to nullify said drive of the apron while said apron receives biscuits from said cutting machine conveyer, and a second driving means operable when said first driving means is nullified for imparting to said apron an intermittent motion corresponding to the travel of said cutting machine conveyer, so that while receiving biscuits said apron travels at a speed corresponding to that of the cutting machine conveyer and when delivering biscuits said surface travels at a speed corresponding to that of said oven conveyer.

GEORGE RALPH BAKER.
HERBERT KIRMAN.